Nov. 23, 1954
R. S. KRAUSE ET AL
2,694,925
HYDRAULIC BRAKE TESTER
Filed Jan. 23, 1952
5 Sheets-Sheet 1
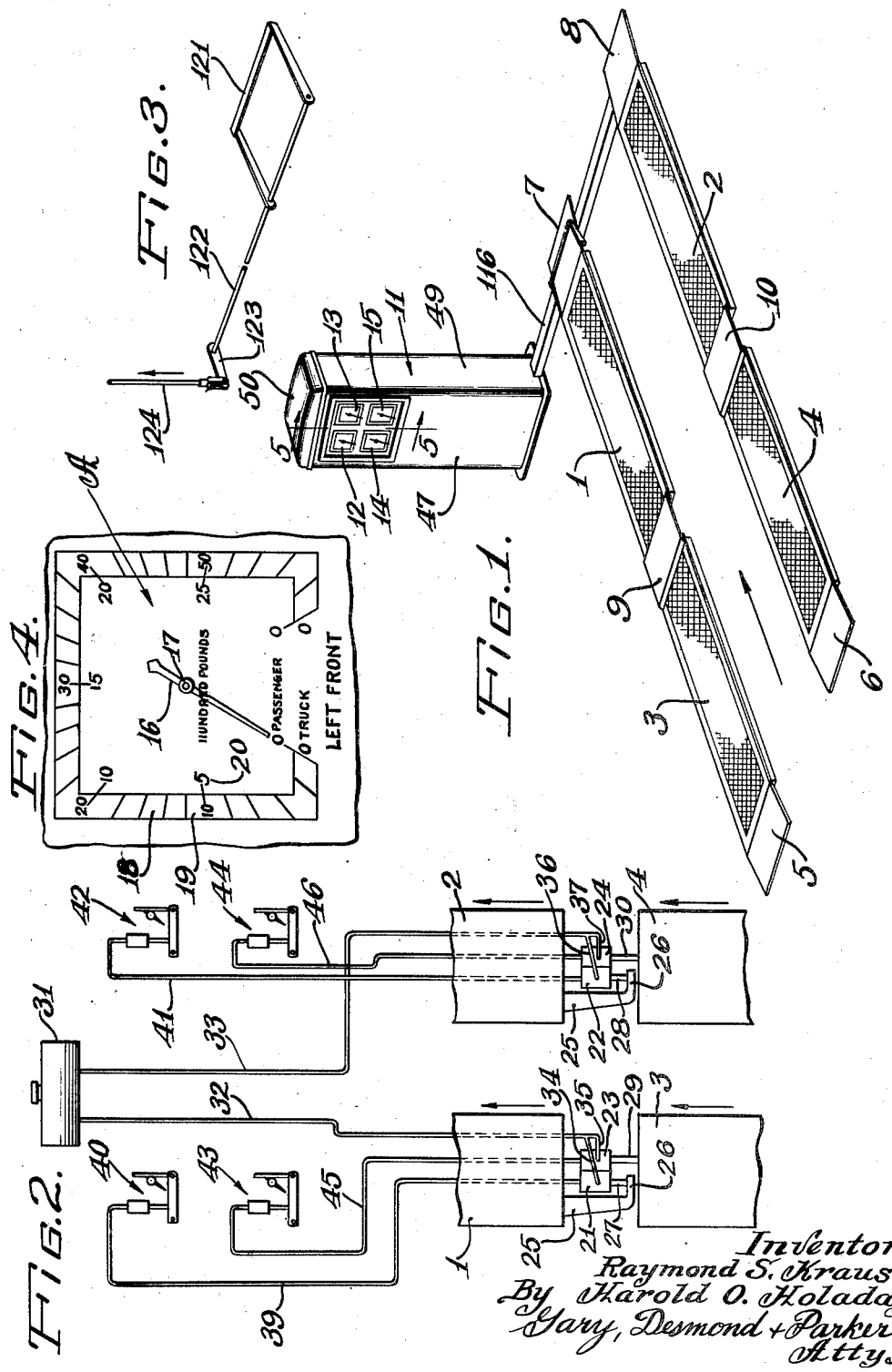
Inventors.
Raymond S. Krause
Harold O. Holaday
By Gary, Desmond + Parker
Attys.

Nov. 23, 1954  R. S. KRAUSE ET AL  2,694,925
HYDRAULIC BRAKE TESTER
Filed Jan. 23, 1952  5 Sheets-Sheet 2
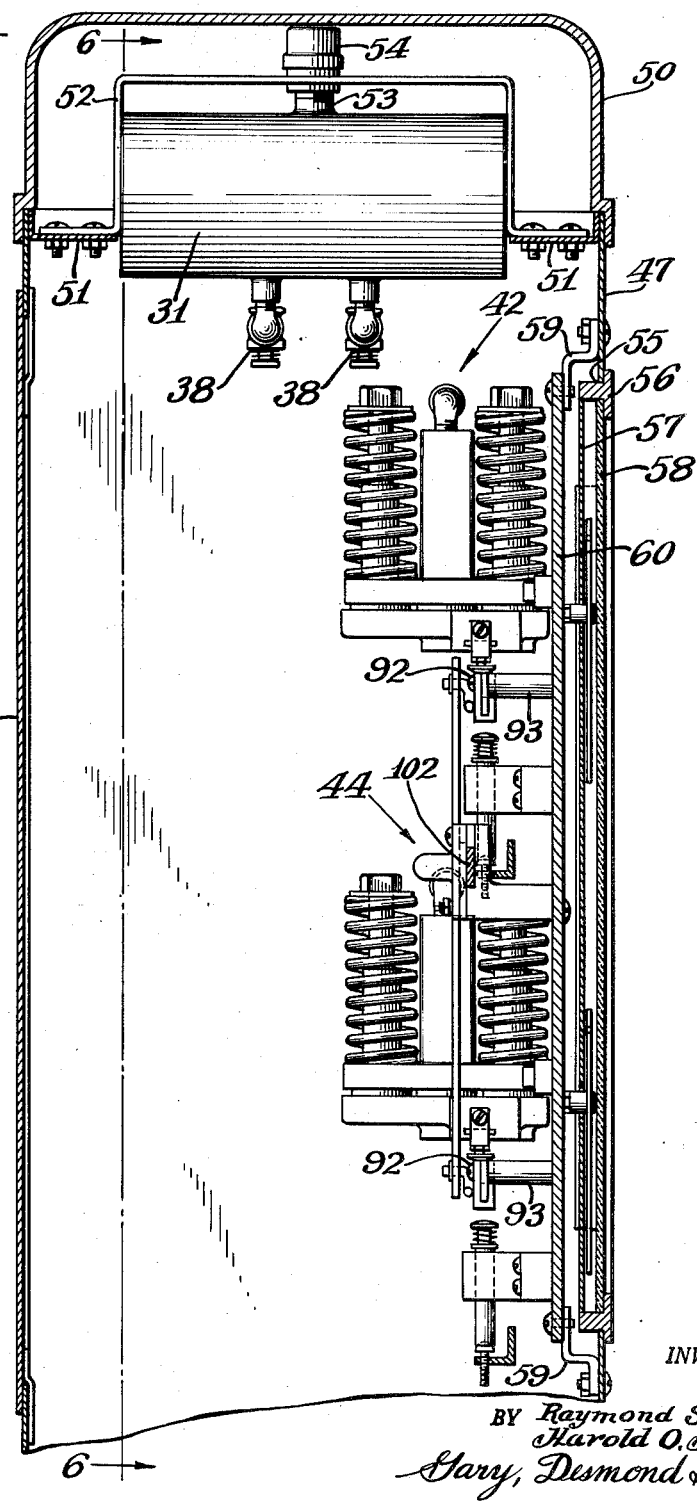
INVENTORS.
BY Raymond S. Krause
Harold O. Holaday
Gary, Desmond & Parker
Attys.

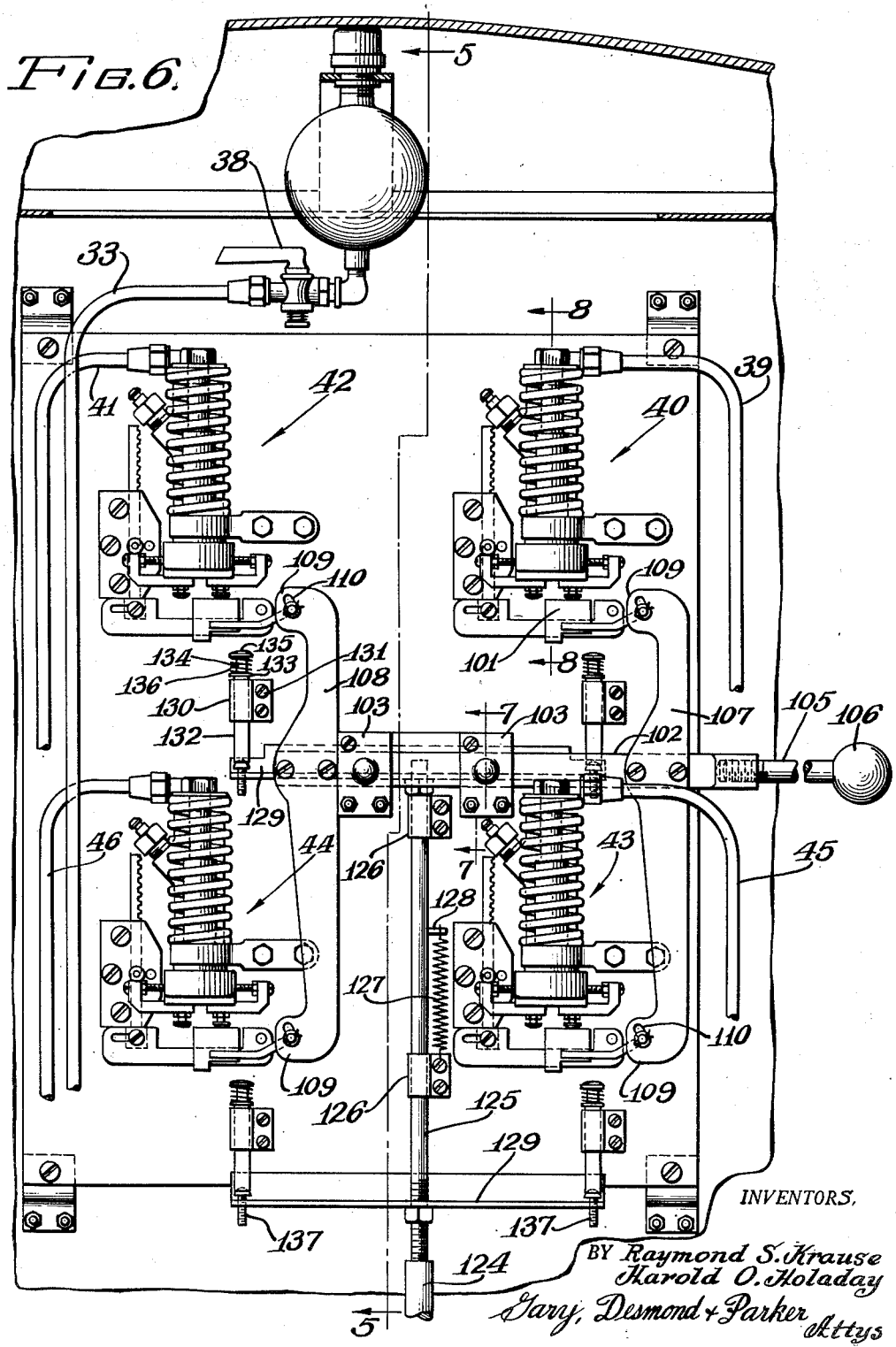

Nov. 23, 1954  R. S. KRAUSE ET AL  2,694,925
HYDRAULIC BRAKE TESTER

Filed Jan. 23, 1952  5 Sheets-Sheet 4

INVENTORS.
Raymond S. Krause
BY Harold O. Holaday
Gary, Desmond & Parker
Attys.

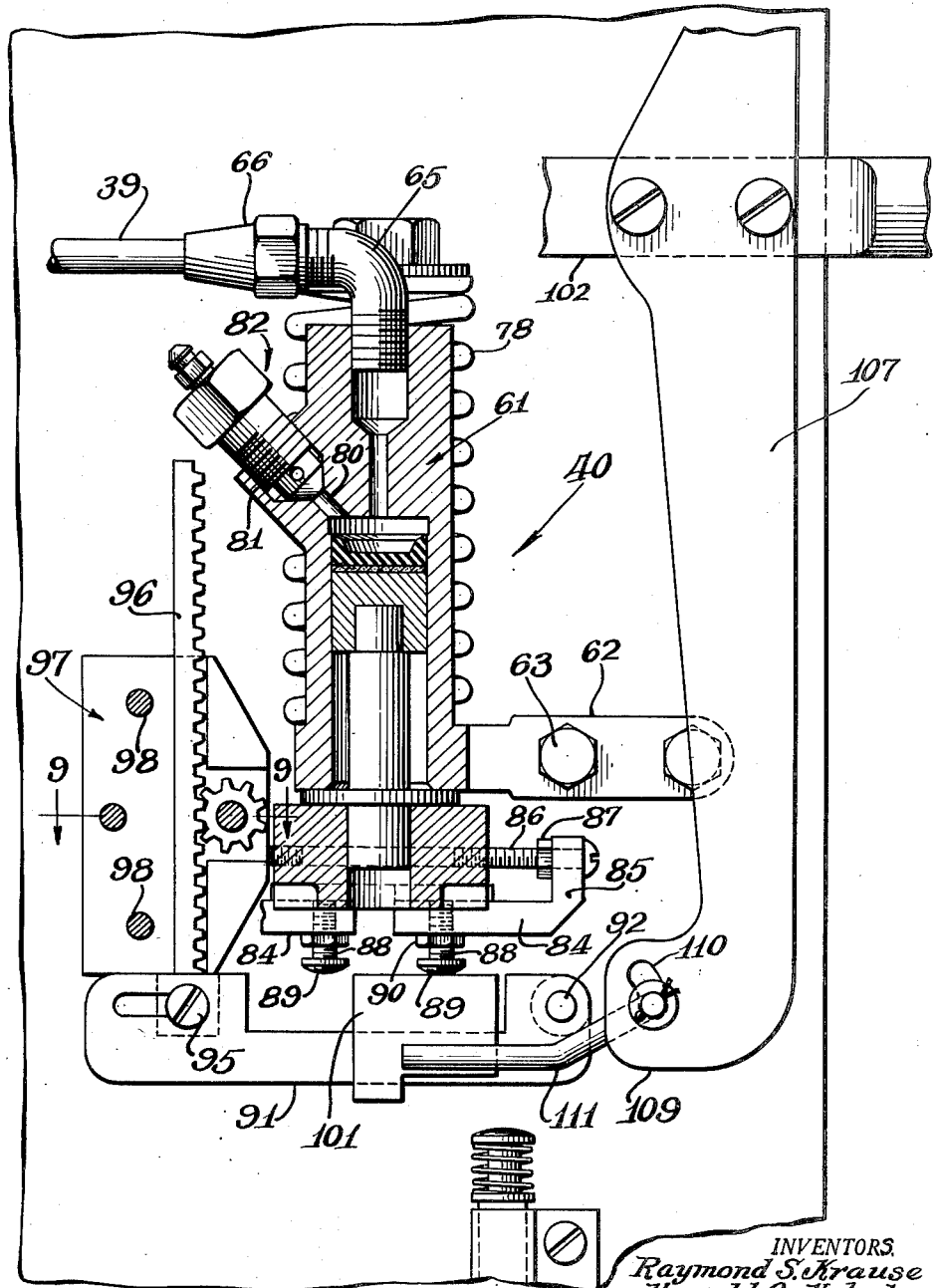

United States Patent Office 2,694,925
Patented Nov. 23, 1954

2,694,925

HYDRAULIC BRAKE TESTER

Raymond S. Krause and Harold O. Holaday, Rock Island, Ill., assignors to Bear Manufacturing Company, Rock Island, Ill., a corporation of Delaware Application January 23, 1952, Serial No. 267,894

8 Claims. (Cl. 73—122)

The invention relates to improvements in brake testers for automotive vehicles and refers particularly to an hydraulic actuated testing device for measuring the braking pressure of the individual wheels of an automatic vehicle.

One of the important features of the present invention resides in a brake tester construction which, by means of a simple adjustment, may with accuracy measure two ranges of brake pressure magnitudes. That is, with the same basic mechanism the braking pressure of the wheels of trucks and passenger cars can be measured, merely by a simple manipulation of a selecting handle.

Another important feature of the invention resides in the combination of a simple and rugged system of levers with a simple hydraulic system, the moving or working parts of which are both reduced to a minimum.

Other objects and advantages of the invention will be apparent from the accompanying drawings and following detailed description.

In the drawings,

Fig. 1 is a perspective view of the brake tester and accompanying brake pressure indicating dials.

Fig. 2 is a diagrammatic view of the hydraulic system employed in the brake tester.

Fig. 3 is a detailed perspective view of a portion of the re-setting mechanism.

Fig. 4 is an enlarged face view of one of the indicating dials.

Fig. 5 is an enlarged sectional view taken on line 5—5 of Fig. 1.

Fig. 6 is an enlarged vertical sectional view taken on line 6—6 of Fig. 5.

Fig. 10 is an enlarged detailed sectional view taken on line 10—10 of Fig. 8.

Figure 8:
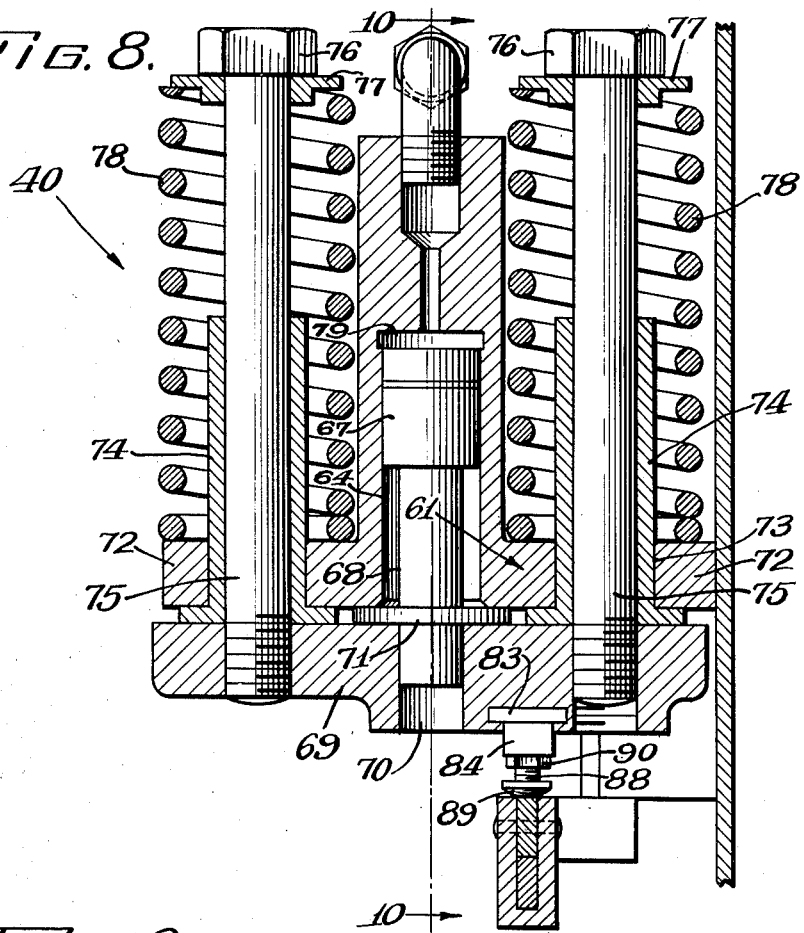
Fig. 8 is an enlarged detailed sectional view taken on line 8—8 of Fig. 6.
Figure 9:
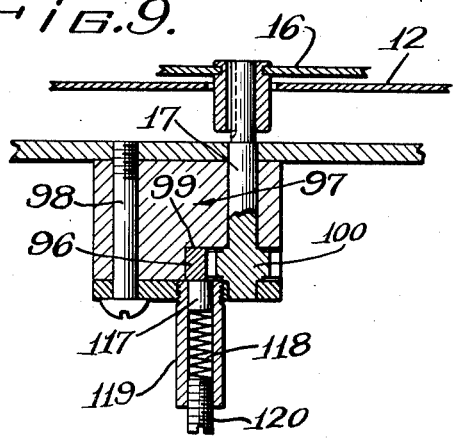
Fig. 9 is a detailed sectional view, parts being broken away, taken on line 9—9 of Fig. 10.
Figure 7:
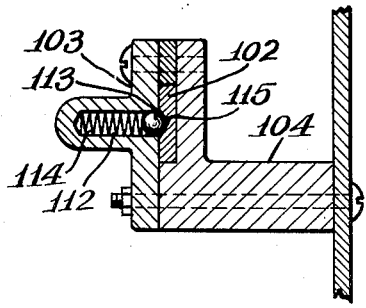
Fig. 7 is an enlarged detailed sectional view taken on line 7—7 of Fig. 6.

Referring in detail to the drawing, 1, 2, 3 and 4 indicate tread plates for the brake tester. The tread plates 1 to 4 inclusive are of substantially conventional construction and can move a limited distance in a plane parallel to the floor surface. The tread plates 3 and 4 at their front ends are provided with ramps 5 and 6 respectively and tread plates 1 and 2 at their rear ends are provided with ramps 7 and 8 respectively. Between the ends of tread plates 1 and 3 and 2 and 4 respectively bridge members 9 and 10 are disposed to permit the passage of the automobile wheels from one tread plate to the other. As viewed in Fig. 1 an automotive vehicle may be driven onto the tread plates to a position where the front wheels rest upon tread plates 1 and 2 and the rear wheels rest upon tread plates 3 and 4. The brakes of the vehicle are applied while the vehicle is in motion over the respective tread plates and the braking pressure of each wheel causes the respective tread plate upon which it rests to move forwardly a distance proportional to the brake pressure which is exerted upon said respective wheel.

A housing 11 is positioned adjacent the tread plates and carries four dials 12, 13, 14 and 15, the dials 12 to 15 inclusive being correlated respectively with the tread plates 1 to 4 inclusive. When the vehicle driven upon the brake tester moves to a position wherein the left front wheel rests upon tread plate 1 and the right front wheel rests upon tread plate 2, the left rear wheel will rest upon tread plate 3 and the right rear wheel will rest upon tread plate 4. When the brakes are applied the braking pressure exerted by the left front wheel will be read upon dial 12; the braking pressure exerted by the right front wheel will be read upon the dial 13 and the braking pressure exerted by the left rear wheel and the right rear wheel will be registered upon the dials 14 and 15 respectively.

The dial A illustrated in Fig. 4 is illustrative of each of the dials 12 to 15 inclusive. The dial A is provided with an indicating pointer 16 mounted upon shaft 17. Calibrations 18 surround the dial face and said calibrations are divided into two sets, an outer set 19 upon which truck brake pressure is read and an inner set 20 upon which passenger car brake pressures are read.

Referring particularly to Fig. 2, a diagrammatic view of the hydraulic system employed is illustrated. As has been hereinbefore described, each of the tread plates 1 to 4 inclusive is adapted for limited movement forwardly relative to the direction of movement of the vehicle which moves upon the tread plates. As has been further described, when the brakes of the vehicle are applied during the motion of the vehicle over the tread plates the tread plates 1 to 4 inclusive move forwardly a distance proportionate to the braking pressure exerted by each wheel. Hydraulic cylinders 21, 22, 23 and 24 are respectively associated with the tread plates 1 to 4 inclusive. Upon each of the rear ends of the tread plates 1 and 2 an arm 25 is carried, said arm having an angularly bent portion 26 which bears against a piston rod 27 and 28 respectively associated with cylinders 21 and 22. At the forward end of each of the tread plates 3 and 4 piston rods 29 and 30 are respectively carried, said piston rods being associated with cylinders 23 and 24 respectively.

A bulk fluid supply tank 31 is connected by means of pipes 32 and 33 to the cylinders 21 to 24 inclusive, pipe 32 being connected to cylinders 21 and 23 by means of branch pipes 34 and 35 respectively and pipe 33 being connected to cylinders 22 and 24 by means of branch pipes 36 and 37 respectively.

In operation, oil is the preferred pressure fluid and tank 31 may be filled with said pressure fluid. A control valve 38 is interposed in each of the pipes 32 and 33, only one of said control valves being illustrated in Fig. 6. When the control valve is opened and the tread plates 1 to 4 inclusive are in their normal position oil may flow from tank 31 through the respective pipes to the cylinders 21 to 24 inclusive. As will be hereinafter more fully described, when the tread plates move forwardly under the influence of the vehicle wheels the pistons within the cylinders 21 to 24 inclusive close the mouths of branch pipes 34 to 37 inclusive whereby pressure established in the cylinders is not transmitted to the oil tank 31.

Cylinder 21 is connected by means of pipe 39 to an indicating unit 40. Cylinder 22 is connected by means of pipe 41 to an indicating unit 42 and cylinders 23 and 24 are respectively connected to indicating units 43 and 44 by means of pipes 45 and 46. As will be hereinafter more fully described, the indicating units 40, 42, 43 and 44 each comprise a pressure cylinder and a system of levers whereby the pressure established in said cylinders is mechanically converted to movement of the indicators 16 upon the respective dials 12 to 15 inclusive. All of the indicating units 40, 42, 43 and 44 are similar and for purposes of brevity only one of said indicating units will be described in detail, it being understood that the remaining indicating units are of identical construction.

The unit 11 is a casing comprising a front wall 47, a rear wall 48, side walls 49 and a removable top 50, Figs. 1 and 5. Flanges 51 are carried within the casing 11 adjacent its top to which a strap 52 is bolted, said strap supporting tank 31 at the upper portion of the housing where it will be accessible upon removal of the top 50. A filling pipe 53 is carried at the top of tank 31 which is closed by a vented cap 54.

The front wall 47 of the casing 11 is provided with an opening 55 which is framed by angle members 56.

The angle members carry a dial panel 57, four sections of which carry the calibrations 18. A transparent plate 58, preferably glass, is carried by the frame members 56 and functions as a closure for the opening 55.

Brackets 59 are bolted to the inner face of the front wall 47 and function to carry a unit-supporting plate 60 which may be screwed to said brackets, the plate 60 lying parallel to panel 57 and to the rear thereof. Plate 60 carries the units 40, 42, 43 and 44, as will be hereinafter more fully described.

Referring particularly to Figs. 8 and 10, each of the units 40, 42, 43 and 44 comprises an inverted T-shaped casting 61. A bracket 62 may be formed integral with the casting 61 and functions to secure the casting to the plate 60 by means of screws 63. The central or staff portion of the T-shaped casting 61 is provided with a central bore 64 which opens at the lower portion of the casting. The bore 64 serves as a pressure cylinder to which the fluid under pressure from the cylinder 21 is transferred. An elbow fitting 65 is threaded into the upper portion of the staff portion of the casting, said fitting at its opposite end being connected by sleeve nut 66 to pipe 39 which is the pipe which connects the cylinder 64 and the cylinder 21.

A piston 67 is slidably positioned within the cylinder 64, said piston being carried at the end of piston rod 68. A cross-head 69 is adapted to be positioned beneath the casting 61, said cross-head being provided with a central aperture 70 which is disposed in axial alignment with the axis of the cylinder 68. A disc 71 is rigidly mounted upon an intermediate portion of piston rod 68 and is adapted to bear upon the upper surface of the cross-head 69, an end of the piston rod 68 registering in aperture 70. The arrangement is such that when fluid under pressure passes through pipe 39 to cylinder 64 piston 67 is moved downwardly whereby cross-head 69 is moved downwardly.

The cross portion 72 of the casting 61 is provided with a pair of oppositely disposed apertures 73, a sleeve 74 is positioned in each of said apertures, said sleeves being adapted to function as guides for rods 75 which are threadedly engaged in the opposite ends of the cross-head 69, said rods extending upwardly from the cross-head through the sleeves 74. The rods 75 at their upper ends terminate in nuts 76 which bear upon flanged washers 77. Coil springs 78 are confined between the flanged washers 77 and the upper face of the cross potrion 72 of the casting 61. The arrangement is such that when piston 67 is moved downwardly by the fluid under pressure introduced through the pipe 39, the crosshead 69 moves downwardly carrying the rods 75 downwardly through sleeves 74. Downward movement of the rods 75 compresses the coil springs 78 and thus the downward movement of piston 67 is resiliently resisted by the coil springs. As will be hereinafter more fully described, when cylinder 64 is relieved of fluid under pressure, springs 78 function to return piston 67 to its uppermost position within cylinder 64.

Cylinder 64 at its upper end is provided with a clearance space 79 into which a bore 80 connects. The bore 80 at its opposite end connects with an enlarged bore 81 in which an air-bleed device 82 is threadedly positioned. The air-bleed device 82 is of conventional construction and functions to remove air from the fluid positioned in cylinder 64.

The lower portion of each of the crossheads 69 is provided with a shouldered slot 83 (Figs. 8 and 10) said slot being transverse to the length of the crosshead. A pair of abutment pin holders 84 are positioned in each slot 83, the section of the holder being such as to slidably register with slot 83. Each holder 84 carries an upwardly extending lug 85 in which an adjusting screw is loosely positioned, said screw being locked to said lug by means of lock nut 87. The end of screw 86 is threaded into the crosshead and the arrangement is such that by turning screw 86, the holder 84 may be positioned at a desired position in slot 83, transverse to the crosshead. Each of the pin holders 84 is associated with the crosshead in the fashion hereinbefore described whereby said holders may be independently adjusted relative to the width of the crosshead.

An abutment screw 88 is threaded into the bottom of each of the pin holders 84, each screw having a slotted abutment head 89. A lock nut 90 engages the threads of each screw whereby each screw may be locked at a desired position relative to the bottom of the crosshead. Thus, each abutment head may be adjusted transversely and vertically with respect to the crosshead. As will be hereinatfer more fully described, those adjustments are employed in calibrating and indexing the pointer 16 with respect to the scales 19 and 20 of the indicators A, and specifically, with reference to Figs. 8 and 10, the indicator 12.

Referring particularly to Figs. 5 and 10, a lever 91 is positioned beneath each unit 40, 42, 43 and 44, each lever being pivoted at one of its ends upon a screw 92 as a pivot point. Each screw 92 is carried by plate 60 and each lever is maintained at the desired distance from the plate by means of a spacer 93 which embraces each screw, the lever being confined between the head of the screw and the end of the spacer. At the free end of each lever 91 a slot 94 is provided in which a pin 95 is freely positioned. Each pin 95 is secured to the lower end of a rack 96, the arrangement being such that swingable movement of each lever 91 through a restricted angle results in vertical movement of its associated rack.

A guide bracket 97 is secured to plate 60 adjacent each unit 40, 42, 43 and 44, being secured to said plate by screws 98. Each bracket 97 is provided with a recess 99 which functions as a guide for constraining movement of rack 96 to the vertical. Shaft 17 which carries each indicator hand or pointer 16 is journaled in bracket 97 and carries at its inner end a pinion 100 which meshes with each rack 96. Hence, vertical movement of each rack serves to rotate each shaft and turn a pointer 16.

A slidable abutment member 101 is slidably mounted upon each lever 91, said member being adapted to serve as a companion contact for the abutment head 89 of either screw 88. The arrangement is such when crosshead 69 moves downwardly under the influence of hydraulic pressure one or the other of the heads 89 will contact the member 101 and swing lever 91 about its pivot screw 92. Rack 96 is thereby moved downwardly and pinion 100 is thereby rotated, rotating shaft 17 and causing pointer 16 to move over the face of dial 12.

A bar 102 (Figs. 5, 6, 7 and 10) is slidably positioned in guides 103 which, in turn, are carried by spacers 104 secured to plate 60. At one end, said bar is formed of substantially circular section and being internally threaded receives a handle rod 105, the latter carrying at its end ball or knob 106 for convenient grasping. Carried in spaced relationship upon bar 102 is a pair of arms 107 and 108 which are rigidly secured to bar 102. Each arm 107 and 108 at each end is provided with an extending lug portion 109, and each of said lug portions is provided with a slot 110. A link 111 is loosely positioned in each slot and connects at its opposite end to a contact member 101. The arrangement is such that when bar 102 is moved within guides 103 by the manipulation of knob 106, contact members 101 may be moved beneath one or the other of the abutment heads 89 of screws 88.

Each guide 103 (Fig. 7) is recessed, as at 112 to receive a ball 113 pressed by a coil spring 114. Bar 102, adjacent each guide 103, is provided with a pair of spaced indentations 115, whereby said bar may be semi-locked in two positions, depending upon the spacing of the indentations 115. The two positions selected are correlated to the position of the abutment members 101 upon levers 91, whereby, in one position member 101 will be beneath the right-hand head 89 (as viewed in Fig. 10) and the other position where the member 101 will be beneath the left hand head 89 and not beneath the right hand head 89.

Thus, for a predetermined movement of crosshead 69, and a predetermined position of bar 102 the lever 91 and, hence, pointer 16 will move a predetermined distance different from the distance it would move were the bar position changed. A convenient arrangement is to have the left hand head 89 (Fig. 10) twice the distance from the pivot screw 92 of the right hand head 89 from said pivot. With this arrangement, for a predetermined movement of the crosshead 69, pointer 16 will move a unit distance or twice said unit distance depending upon whether member 101 is contacted by the right hand head (Fig. 10) or the left hand head. Of course, the arrangement contemplates any multiple movement and is not to be limited to a 2 to 1 movement.

In the set up of the device illustrated in Fig. 1, the cylinders 21 to 24 inclusive may be conveniently positioned beneath the bridge plates 9 and 10, a recess (not shown) in the supporting floor being provided to house the cylinders. Pipes 32, 33, 39, 41, 45 and 46 may be conveniently led from the cylinders 21, 22, 23 and 24 to the housing 11 through conduit 116.

In the use of the device, if the brakes of a passenger automobile are to be measured, the bar 102 is so set that the contact members 101 are disposed beneath those contact heads 89 which are closest to the pivot points 92. The automobile is driven upon the tread plates 1 to 4 inclusive in the manner hereinbefore described and the brakes are applied while said automobile is moving over the tread plates. The application of the brakes will cause a predetermined movement of the tread plates in the direction of motion of the automobile and consequently predetermined fluid pressure will be established in each of the cylinders 21 to 24 inclusive. The pressure in these cylinders will be respectively transferred to the units 40, 43, 42 and 44. In each of the units the fluid pressure transferred thereto will move piston 67 downwardly within cylinder 64, the movement being in proportion to the fluid pressure established in the cylinders 21 to 24 inclusive. Accordingly, the crosshead 69 will be moved downwardly and the respective abutment heads 89 will contact the respective abutment members 101. The levers 91 of each of the units will thereby be rocked about each pivot point 92 and the rack 96 of each of the units will move downwardly a predetermined extent. Downward movement of each of the racks results in rotation of each of the shafts 17 and the pointer upon each of the dials 12 to 15 inclusive will indicate upon the scale 20 the braking pressure established by each wheel of the automobile. When the fluid pressure within the cylinders 64 of each of the units has been relieved the springs 78 tend to return the pistons 67 to their normal upraised position whereby the tread plates 1 to 4 inclusive return to their normal position by virtue of the back pressure established by the reverse movement of the pistons 67.

In order that the pointers 16 shall remain at their maximum indicating position after the crossheads 69 have moved upwardly, a friction member 117 bears upon each rack 96, said friction member being urged into frictional contact with the side of the rack by means of coil spring 118 which is housed in tube 119. The compression of coil spring 118 may be controlled by means of the adjusting screw 120 which threads into the end of tube 119. Accordingly, after the pointers 16 have swung to the maximum position and after the crossheads 69 have moved upwardly, the levers 91, racks 96, shafts 17 and pointers 16 will remain in the position to which they were moved by the application of the brakes.

Of course, if the readings on dials 12 to 15 inclusive have been noted, it is desired that the pointers 16 all be returned to their zero position. To accomplish this a trip lever 121 is positioned adjacent the rear end of tread plate 1. The trip lever 121 is mounted upon a shaft 122 which in turn is rigidly carried by an arm 123. Arm 123 is pivotally connected to rod 124 which extends upwardly to the housing 11. Within the housing rod 124 is secured to an extension 125 which latter is guided by means of sleeves 126 which are secured to plate 60. A coil spring 127 is anchored at one end upon a sleeve 126 and at the opposite end is anchored upon a lug 128 carried upon the extension 125. The arrangement is such that coil spring 127 normally tends to pull the extension 125 downwardly thereby moving rod 124 downwardly. This movement in turn is imparted to rod 122 whereby the trip lever 121 is moved upwardly above the plane of the tread plates. Consequently, when an automobile is driven from the tread plates it moves over the trip lever 121 and tends to rock said trip lever in such fashion as to move rod 124 upwardly.

The extension 125 carries a pair of spaced angle members 129. Beneath each of the levers 91 a sleeve 130 is positioned, said sleeve being mounted upon plate 60 by means of screws 131. A tubular member 132 is slidably positioned in each sleeve 130, said tubular member carrying a flange 133 adjacent its upper portion. A pin 134 is telescopically positioned in the upper end of each tube 132, said pin having an enlarged head 135. A coil spring 136 is confined between head 135 and flange 133 and tends to urge the pin 134 outwardly with respect to tube 132. Adjusting screws 137 are threadedly positioned adjacent each end of the angle members 129 and are disposed immediately beneath the lower ends of tubes 132. The heads 135 of pins 134 are disposed immediately beneath each of the levers 91, the arrangement being such that when the trip lever 121 is moved by the automobile leaving the tread plates, the extension 125 is moved upwardly against the tension of spring 127. Upward movement of the extension 125 moves the angle bars 129 upwardly whereby the heads of screws 137 contact the lower ends of tubes 132 thereby moving said tubes upwardly within the sleeves 130. Upward movement of the tubes 132 moves heads 135 to resilient contact with the bottoms of levers 91 and continued upward movement of the extension 125 results in the rocking of the levers 91 about the pivot points 92 in a clockwise direction as viewed in Fig. 10. Upward movement of the levers 91 results in upward movement of the racks 96 and hence shafts 17 are rotated to bring the pointers 16 to their zero position.

If it is desired to measure the braking pressure of a truck, for instance, the bar 102 is so manipulated as to have levers 108 move abutment members 101 along the levers 91 until said abutment members are disposed beneath the abutment heads 89 which are remote from the pivot points 92. When the abutment members 101 are thus moved downward movement of the abutment heads will result in contact of the remote abutment head with the abutment member. It can readily be seen that for a predetermined movement of the crossheads 69 the levers 91 will be swung vertically through a distance which is one-half of the swing of the levers as previously described. Accordingly, the braking pressure of the wheels of the truck will be indicated upon the calibrations 19 of the indicators 12 to 15 inclusive.

It can readily be seen that herein is provided an hydraulically actuated brake testing device which has a minimum number of operating parts; a simple leverage arrangement and a simple hydraulic system. The device may be so used as to measure conveniently braking pressures within two magnitude ranges by the simple shift of a lever, and the measuring units are so associated as to measure the braking pressure upon the individual wheels of a vehicle. It is apparent that many modifications of the present invention may be made without departing from the spirit of the invention and it is not intended that the present invention be limited except as necessitated by the appended claims.

We claim as our invention:

1. In combination with an automotive brake tester of the type wherein movement of four tread plates upon which the respective wheels of an automobile are supported establish fluid pressure in four hydraulic systems in response to the respective tread plate movements, of a fluid pressure cylinder for connection to each hydraulic system, a piston rod movable in each cylinder in repsonse to the fluid pressure in said cylinder, a crosshead carried by each piston rod, a lever pivoted adjacent each crosshead, a slidable abutment member slidably carried longitudinally upon each lever for contact with each crosshead when said crosshead moves in one direction, and measuring means connected to each lever for indicating the movement of said crosshead.

2. In combination with an automotive brake tester of the type wherein movement of four tread plates upon which the respective wheels of an automobile are supported establish fluid pressure in four hydraulic systems in response to the respective tread plate movements, of a fluid pressure cylinder for connection to each hydraulic system, a piston rod movable in each cylinder in response to the fluid pressure in said cylinder, a crosshead carried by each piston rod, a lever pivoted adjacent each crosshead, a slidable abutment member slidably carried upon each lever and movable longitudinally upon said lever for contact with each crosshead when said crosshead moves in one direction, measuring means connected to each lever for indicating the movement of said crosshead and means for simultaneously moving each abutment member on each lever to change the movement of each lever with a predetermined movement of each crosshead.

3. In an automotive brake tester of the type wherein movement of four tread plates upon which the respective wheels of an automobile are supported establish fluid pressure in four hydraulic systems in response to the respective tread plate movements, a fluid pressure cylinder connected to each hydraulic system, a piston rod movable in each cylinder in response to the fluid pressure in said cylinder, a crosshead carried by each piston rod, a lever pivoted adjacent each crosshead, a slidable abutment member carried upon each lever for contact with each crosshead when said crosshead moves in one direction, measuring means connected to each lever for indicating the movement of said crosshead, and means for simultaneously moving all of said abutment members upon all of said levers to change the movement of said levers with a predetermined movement of their respective crossheads.

4. In an automotive brake tester of the type wherein movement of four tread plates upon which the respective wheels of an automobile are supported establish fluid pressure in four hydraulic systems in response to the respective tread plate movements, a fluid pressure cylinder connected to each hydraulic system, a piston rod movable in each cylinder in response to the fluid pressure in said cylinder, a crosshead carried by each piston rod, a lever pivoted adjacent each crosshead, a slidable abutment member carried upon each lever for contact with each crosshead when said crosshead moves in one direction, measuring means connected to each lever for indicating the movement of said crosshead and means mounted adjacent said levers and separate from said measuring means for contacting said levers to simultaneously return all of said levers to their original positions after pressure is relieved in said cylinders.

5. A device as set forth in claim 4 comprising, tripping means disposed adjacent the end of a tread plate and movable by movement of an automobile wheel from said tread plate for actuating said lever contacting means.

6. In combination with an automotive brake tester of the type comprising four movable tread plates for respectively supporting the four wheels of an automotive vehicle, a fluid pressure cylinder disposed adjacent each tread plate, and a piston rod operable in each cylinder and connected to the respective tread plates to establish fluid pressure in said cylinders in proportion to the movement of the respective tread plates, of a closed casing, a plurality of piston and cylinder means positioned in said casing, pipes for connecting said first mentioned cylinders respectively to said piston and cylinder means in said casing, a lever positioned adjacent each piston and cylinder means in said casing, a meter needle operated by each lever to measure the displacement of said respective tread plates, and means actuatable from the exterior of said casing for simultaneously changing the mechanical advantage of all of said levers to change the movement of each needle in response to a predetermined movement of said respective tread plates.

7. In an automotive brake tester of the class comprising four movable tread plates for respectively supporting the four wheels of an automotive vehicle, a fluid pressure cylinder disposed adjacent each tread plate, a piston rod operable in each cylinder and connected to the respective tread plates to establish fluid pressure in said cylinders in proportion to the movement of the respective tread plates, the combination of a closed casing remotely positioned from said tread plates, four cylinders positioned in said casing, pipes respectively connecting said first-mentioned cylinders and said encased cylinders, a piston rod movable in each encased cylinder in response to the fluid pressure in said cylinder, a lever positioned adjacent each piston rod in said casing and actuated by movement of said rod, a dial having a set of calibrations, a meter needle operable over each dial and operated by each lever to measure the displacement of said respective tread plates, means operable from the exterior of said casing for changing the mechanical advantage of each lever a predetermined degree to change the movement of each needle in response to a predetermined movement of said respective tread plates, and a second set of calibrations upon said dial correlated to said predetermined change in mechanical advantage of said lever.

8. In an automotive brake tester of the type wherein movement of four tread plates upon which the respective wheels of an automobile are supported establishes fluid pressure in four hydraulic systems in response to the respective tread plate movements, of a fluid pressure cylinder for connection to each hydraulic system, a piston rod movable in each cylinder in response to the fluid pressure in said cylinder, a crosshead carried by each piston rod, resilient means biasing said crosshead against movement thereof in one direction, a lever pivoted adjacent each crosshead, an abutment member adjustably positioned longitudinally upon each lever, means for positioning said abutment member on said lever in a plurality of fixed positions, and calibrated measuring means connected to each lever for indicating the movement of said crosshead for each position of said abutment means.

References Cited in the file of this patent

UNITED STATES PATENTS

| Number | Name | Date |
|---|---|---|
| 32,514 | Finnegan et al. | June 11, 1861 |
| 1,811,326 | Muller | June 23, 1931 |
| 1,922,659 | Cadwell | Aug. 15, 1933 |
| 1,971,388 | Scruby | Aug. 28, 1934 |
| 2,033,912 | Weaver | June 4, 1935 |
| 2,582,146 | Moore | Jan. 8, 1952 |

FOREIGN PATENTS

| Number | Country | Date |
|---|---|---|
| 111,150 | Germany | Aug. 1, 1925 |